(12) United States Patent
Haas et al.

(10) Patent No.: US 6,451,927 B1
(45) Date of Patent: Sep. 17, 2002

(54) POLYMERIZABLE COMPOSITIONS IN NON-FLOWABLE FORMS

(75) Inventors: Hans Haas, Westbrook; Matthew Burdzy, South Windsor, both of CT (US)

(73) Assignee: Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/806,491

(22) PCT Filed: Oct. 20, 1999

(86) PCT No.: PCT/US99/24594

§ 371 (c)(1),
(2), (4) Date: Apr. 12, 2001

(87) PCT Pub. No.: WO00/25628

PCT Pub. Date: May 11, 2000

Related U.S. Application Data

(60) Provisional application No. 60/106,560, filed on Nov. 2, 1998.

(51) Int. Cl.[7] .......................... A45D 40/06; C08L 33/00; C08L 79/08

(52) U.S. Cl. ..................... 525/426; 525/426; 525/309; 525/308; 525/305; 525/304; 525/302; 524/555; 524/556; 524/559; 524/560; 428/35.7; 428/36.9

(58) Field of Search .................... 524/555, 556, 524/559, 560; 525/302, 304, 305, 308, 309, 426, 436; 428/35.7, 36.9

(56) References Cited

U.S. PATENT DOCUMENTS

| | | | |
|---|---|---|---|
| 3,547,851 A | 12/1970 | Frauenglass | 260/23.5 |
| 4,497,916 A | 2/1985 | Cooke et al. | 523/176 |
| 4,532,270 A | 7/1985 | Rossi et al. | 523/176 |
| 4,710,539 A | 12/1987 | Siadat et al. | 525/59 |
| 4,863,300 A | 9/1989 | Arona-Delonghi | 401/68 |
| 4,916,184 A | 4/1990 | Clark | 525/27 |
| 4,984,718 A | 1/1991 | Cardia | 222/390 |
| 5,618,857 A | 4/1997 | Newberth, III et al. | 523/176 |

*Primary Examiner*—James J. Seidleck
*Assistant Examiner*—Sanza L. McClendon
(74) *Attorney, Agent, or Firm*—Steven C. Bauman

(57) ABSTRACT

The present invention relates to adhesive and sealant compositions in non-flowable form. More particularly, the present invention relates to non-flowable adhesive and sealant compositions which are particularly useful in the thread-locking and sealing applications and which can be packaged in a convenient pocket-sized applicator dispenser.

32 Claims, 2 Drawing Sheets

POLYMERIZABLE COMPOSITIONS IN NON-FLOWABLE FORMS

This application claims priority from provisional appli. Ser. No. 60/106,560, filed Nov. 2, 1998.

BACKGROUND OF THE INVENTION

1. Field of the Invention

The present invention relates to adhesive and sealant compositions in non-flowable form. More particularly, the present invention relates to non-flowable adhesive and sealant compositions which are particularly useful in the threadlocking and sealing applications and which can be packaged in a convenient pocket-sized applicator dispenser.

2. Brief Description of Related Technology

Liquid adhesive compositions have long been used in sealing and threadlocking applications and have become a standard part of assembly production as well as in the maintenance of machinery, tools and the like. Among the liquid adhesive compositions commonly used in these applications are anaerobic compositions. These single part compositions provide excellent threadlocking and sealant properties and remain stable until they are placed between parts where they cure in the absence of air. Moreover, these compositions remain stable for long periods of time during storage in the bottle.

In many applications, wicking of the liquid composition into tight spaces between adjoining parts is desirable. However, in many situations the ability of the liquid adhesive to migrate from parts is problematic, causing contamination of sensitive parts. Moreover, in many maintenance applications, the spillage of liquid adhesive compositions can be deleterious as well as inconvenient. One attempt to create a convenient ready-to-use threadlocking product has been the use of preapplied adhesive compositions, such as those in latex or micro-encapsulated form.

In such cases, the adhesive composition is applied to the threaded part, such as a bolt or nut, and remains in the uncured state until mated. As an example of a known preapplied adhesive composition, U.S. Pat. No. 4,497,916 discloses a continuous liquid phase adhesive composition to which is added solid wax-like particles dispersed therein. These particles may be chosen from polyethylene glycol materials having 4,000 to 20,000 molecular weight, stearic acid, acid waxes or stearic esters. The compositions disclosed in the '916 patent are formed by heating this combination of materials in slurry form and applying it, while heated, to threads. The composition then cools to obtain a non-mobile coating. This composition requires substantial preparation in order to obtain the composition and apply it on parts.

While preapplied coatings have many advantages, special processing is required to prepare and apply the adhesive coatings in advance. Such compositions are not useful on an as needed basis, such as when a immediate need for application of a curable composition is required. Moreover, to fully utilize preapplied compositions, it is necessary to stock and inventory of a variety of different sizes of threaded parts in advance. Thus, preapplied coatings do not solve the problem for many applications requiring ready-to-use compositions.

Attempts have been made to make a non-flowable anaerobic adhesive composition in the past. For example, U.S. Pat. No. 3,547,851 discloses anaerobic compositions which are rendered non-flowable at room temperature by uniform distribution throughout the adhesive of a network of normally solid organic substances insoluble in the adhesive. These organic substances are basically linear in nature and are typified by insoluble thermoplastic resins, such as solid paraffin hydrocarbons and normally solid fatty substances having about 10 or more carbon atoms. Efforts to date have failed in making a viable commercial product using the technology of this patent, due at least in part to the inability of the composition to maintain a non-flowable state at temperatures greater than room temperature. This has proved problematic, since warehouse temperatures often are greater than 100° F. (38° C.). Compositions made in accordance with the teachings of this patent have been limited by several technical difficulties. First, melting at elevated temperatures destroys the integrity of the composition and its ability to be applied. Furthermore, crumbling of these compositions during application or as a result of storage has been prevalent. Finally, the reductions in break torque due to the addition of the insoluble thermoplastic materials resulted in the inability to make a high strength composition. Relatively high levels of these insoluble thermoplastics were required to produce a non-flowable composition. Moreover, compositions of the '851 patent required melting of the insoluble thermoplastic materials prior to incorporation in adhesive. Heating or melting of the composition was required to get the desired effect of immobility.

The present invention seeks to overcome such disadvantages and in particular addresses many of the specific deficiencies of the '851 patent. The present invention provides a solution to creating non-flowable adhesive and sealant compositions, which can be stored at temperatures greater than about 100° F. (37° C.), such as about 120° F. (49° C.) up to about 180° F. (82° C.), without fear of loss of structural immobility through melting. Moreover, the present invention provides new polymeric matrix additives which can be added directly to the adhesive composition without melting and which do not require heating or melting of the total combination in order to obtain the desired result. Further, high strength products can be made with relatively minor amounts of the polymeric matrix additive due to the ability of the inventive compositions to be rendered non-flowable.

As previously mentioned, U.S. Pat. No. 3,547,851 discloses anaerobic compositions which have been rendered non-flowable through the inclusion of various waxes. The '851 patent, however, teaches away from using waxy materials having melting points greater than 250° F. (121° C.). Polyethylene glycol waxes, i.e., the preferred type of wax disclosed in the '851 patent, were found to melt during storage temperatures of about 130° F. (54° C.) and became brittle after extended periods of storage at normal temperatures.

Both the '851 and '916 patents discussed above require the addition of a solid material which is melted in order to be incorporated into the polymerizable monomer. Moreover, in practicing the '851 patent, an extremely large amount, e.g., 50% by weight, of polyethylene glycol was required in order to yield a composition which remained non-flowable at temperatures of about 158° F. (70° C.). Such extreme amounts of wax added to the polymerizable monomer significantly reduced the torque strength of threadlocking compositions.

In contrast, the present invention seeks to obtain non-flowability at significantly greater temperatures, e.g., up to about 180° F. (82° C.) or more, while using as little as 5% to 15%, and desirably 7 to 10%, of the polymeric matrix.

This is due to the unique physical and chemical properties of the polymeric matrix additive used in the present invention. Moreover, the present invention seeks to overcome the prior art problem of softening of the compositions over time.

SUMMARY OF THE INVENTION

The present invention relates to an adhesive composition which includes at least one room-temperature-flowable polymerizable compound in combination with a polymeric matrix present in an amount sufficient to render the composition non-flowable at temperatures of at least about 120° F. (49° C.). The polymerizable compound or composition may be selected from a wide group of materials including anaerobics, epoxies, acrylics, polyurethanes, olefinic compounds and combinations thereof. Anaerobic compositions are most desirable since they have unique applications in many threadlocking and sealant areas where the need for a non-flowable material exists. The polymeric matrix may be selected from polyamides, polyacrylamides, polyimides, polyhydroxyalkylacrylates and combinations thereof.

In one desired embodiment of the present invention an anaerobic adhesive composition is provided which includes a polymerizable (meth)acrylate monomer, a polymerization initiator for the monomer, and a polymeric matrix material miscible or otherwise compatible with the monomer. The matrix material is present in an amount sufficient to render the composition non-flowable at temperatures of at least about 70° F. (21° C.). The polymeric matrix and polymerizable component readily form a stable mixture or combination without phase separation of component parts.

In a further desirable embodiment the present invention provides a non-flowable adhesive or sealant composition, which includes a self-supporting combination of a polymerizable (meth)acrylate monomer; a polymerization initiator; and a polymeric material miscible with the (meth)acrylate and the initiator, and present in an amount sufficient to render the composition non-flowable at temperatures of at least about 120° F. (49° C.), and desirably about 160° F. (71° C.).

The present invention also contemplates a method of making the non-flowable composition, as well as a method of use.

The present invention also contemplates an article of manufacture. In this embodiment there is included a dispensing container for housing and dispensing a non-flowable adhesive or sealant composition. The container includes a generally elongate hollow body having first and second ends, with one of the ends having a dispense opening. The container houses an adhesive or sealant composition, which includes a polymerizable (meth)acrylate monomer; a polymerization initiator; and a polymeric material miscible with the (meth)acrylate and the initiator and present in an amount sufficient to render the composition non-flowable at temperatures of at least about 120° F. (49° C.), up to about 180° F. (54° C.).

The compositions of the present invention are non-flowable, i.e., they are capable of existing in a self-supporting mass without migrating at temperatures of at least 70° F. (21° C.), desirably 120° F. (49° C.), up to at least about 180° F. (82° C.). In practical applications, these compositions are provided in an applicator such that they can be conveniently dispensed to the desired location. For example, one convenient means of dispensing is a pocket-sized or hand-held lipstick-type container which can be easily carried by the mechanic or maintenance worker for use as needed. Such a dispenser solves the problem of spillage in the environment which can be particularly problematic where contamination sensitive parts are present or when migration of adhesive is generally undesirable.

DETAILED DESCRIPTION OF THE INVENTION

Figure 1:
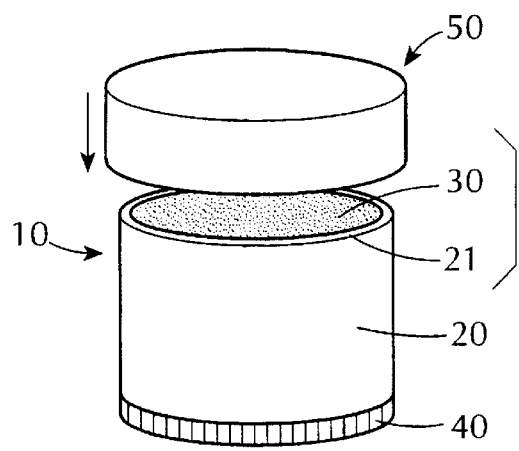
FIG. 1 is a perspective view of a lipstick-type dispenser container with a dispenser cap.

The compositions and articles of manufacture of the present invention include at least one room-temperature flowable polymerizable compound which is useful in adhesive and/or sealant applications. These compositions may be naturally liquid at room temperature or combined with a suitable solvent to render them flowable at room temperature. Among the classes of polymerizable monomer useful in the present invention include, without limitation, anaerobic compositions, epoxy compositions, acrylic compositions, polyurethane compositions, olefinic compositions and combinations thereof.

One desirable class of polymerizable monomers useful in the present invention is the poly- and mono-functional (meth)acrylate esters. One class of polymerizable esters useful have the general structure $CH_2=C(R)COOR^1$ where R is H, $CH_3$, $C_2H_5$ or Cl, and $R^1$ is $C_{1-8}$ mono- or bicycloalkyl, a 3 to 8-membered heterocyclic radial with a maximum of two oxygen atoms in the heterocycle, H, alkyl, hydroxyalkyl or aminoalkyl where the alkyl portion is $C_{1-8}$ straight or branched carbon atom chain.

Among other desirable polymerizable monomers useful in the present invention include those which fall within the structure:

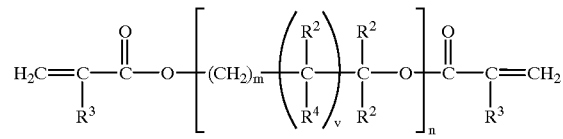

where $R^2$ may be selected from hydrogen, alkyl of 1 to about 4 carbon atoms, hydroxyalkyl of 1 to about 4 carbon atoms or

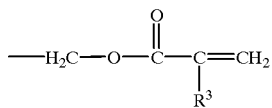

$R^3$ may be selected from hydrogen, halogen, and alkyl of 1 to about 4 carbon atoms and $C_{1-8}$ mono- or bicycloalkyl, a 3 to 8 membered heterocyclic radical with a maximum of 2 oxygen atoms in the ring;

$R^4$ may be selected from hydrogen, hydroxy and

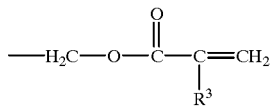

m is an integer equal to at least 1, e.g., from 1 to about 8 or higher, for instance from 1 to about 4;

n is an integer equal to at least 1, e.g., 1 to about 20 or more; and v is 0 or 1.

Other desirable acrylate ester monomers are those selected from urethane acrylates within the general structure:

$$(CH_2=CR^5.CO.O.R^6.O.CO.NH)_2R^7$$

where $R^5$ is H, $CH_3$, $C_2H_5$ or halogen, such as Cl; $R^6$ is (i) a $C_{1-8}$ hydroxyalkylene or aminoalkylene group, (ii) a $C_{1-6}$ alklamino-$C_{1-8}$ alkylene, a hydroxyphenylene, aminophenylene, hydroxynaphthalene or amino-naphthalene optionally substituted by a $C_{1-3}$ alkyl, $C_{1-3}$ alkylamino or di-$C_{1-3}$ alkylamino group; and $R^7$ is $C_{2-20}$ alkylene, alkenylene or cycloalkylene, $C_{6-40}$ arylene, alkarylene, aralkarylene, alkyloxyalkylene or aryloxyarylene optionally substituted by 1-4 halogen atoms or by1-3 amino or mono- or di-$C_{1-3}$ alkylamino or $C_{1-3}$ alkoxy groups; or acrylates within the general structure:

$$(CH_2=CR^5.CO.O.R^6.O.CO.NH.R^7.NH.CO.X—)_nR^8$$

where $R^5$, $R^6$, and $R^7$ are as given above; $R^8$ is a non-functional residue of a polyamine or a polhydric alcohol having at least n primary or secondary amino or hydroxy groups respectively; X is O or $NR^9$ where $R^9$ is H or a $C_{1-7}$ alkyl group; and n is an integer from 2 to 20.

Among the specific monofunctional polymerizable acrylate ester monomers particularly desirable, and which correspond to certain of the structures above, are hydroxypropyl methacrylate, 2-hydroxyethyl methacrylate, methyl methacrylate, tetrahydrofurfuryl methacrylate, cyclohexyl methacrylate, 2-aminopropyl methacrylate and the corresponding acrylates.

Specific polyfunctional monomers which are desirable include polyethylene glycol dimethacrylate and dipropylene glycol dimethacrylate.

Other desirable polymerizable acrylate ester monomers useful in the instant invention are selected from the class consisting of the acrylate, methacrylate and glycidyl methacrylate esters of bisphenol A. Particularly desirable among all of the free-radical polymerizable monomers mentioned are ethoxylated bisphenol-A-dimethacrylate ("EBIPMA").

Mixtures or copolymers of any of the above-mentioned free-radical polymerizable monomers can be employed.

Polymerizable vinyl monomers may also be optionally incorporated and are represented by the general structure:

$$R^{10}—CH=CH—R^{10}$$

where $R^{10}$ is alkyl, aryl, alkaryl, aralkyl, alkoxy, alkylene, aryloxy, aryloxyalky, alkoxyaryl, aralkylene, OOC-$R^1$, where $R^1$ is defined above, can also be effectively employed in the instant composition.

Copolymers or mixtures of monomers disclosed herein with other compatible monomers are also contemplated.

Among the polymerizable polyacrylate esters utilized in accordance with the present invention include those which are exemplified but not restricted to the following materials: di-, tri-, and tetra-ethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stabilizers, such as polyhydric phenols, quinones, and the like are included. These materials function as free radical inhibitors to prevent premature polymerization. It is also within the scope of the present invention to obtain modified characteristics for the cured composition by utilization of one or more monomers either from those listed above or additional additives such as unsaturated monomers, including unsaturated hydrocarbons and unsaturated esters.

The compositions of the present invention generally require a polymerization agent which initiates or otherwise promotes the polymerization of the monomer. In the case of anaerobic compositions, peroxy initiators are generally employed. However, the invention is not limited to anaerobic compositions and consequently other polymerization promoting materials, such as free radical promoters and initiators, metal catalysts and the like may be employed suitable to the chosen monomer and/or polymerizable composition.

The peroxy initiators useful in anaerobic compositions of the present invention include the hydroperoxy polymerization inhibitors and most preferably the organic hydroperoxide inhibitors having the formula ROOH, where R generally is a hydrocarbon radical containing up to about 18 carbons, desirably an alkyl, aryl or aralkyl radical containing up to about 12 carbon atoms. Typical examples of such hydroperoxides include cumene hydroperoxide, methylethylketone hydroperoxide as well as hydroperoxides formed by the oxygenation of various other hydrocarbons such as methylbutene, cetane and cyclohexane. Other peroxy initiators such as hydrogen peroxide or materials such as organic peroxides or peresters which hydrolyoize or decompose to form hydroperoxides may also be employed.

The peroxy initiators commonly employed in anaerobic compositions typically comprise less than about 20% by weight of the composition. Desirably, however, they are employed in lower levels such as 0.1% to about 10% by weight of the total composition.

The polymeric matrix useful in the present invention must be present in a sufficient amount to render the normally flowable polymerizable compound non-flowable at temperatures of at least about room temperature and more desirably at temperatures of at least about in the range of 70° F. (21° C.) to about 180° F. (82° C.) and even more desirably greater than 120° F. (49° C.) to about 160° F. (71° C.).

The polymeric matrix includes an organic material which generally has a melting point or softening point range in the range of about 200° F. (93° C.) to about 500° F. (260° C.), more desirably greater than 250° F. (121° C.) to about 500° F. (260° C.). Polymeric materials useful in the present invention may be selected from polyamides, polyacrylamides, polyimides, polyhydroxyalkylacrylates and combinations thereof. Of particular utility are polyamide materials having a melting point of about 260° F. (127° C.). One such polyamide is commercially available as a non-reactive free flowing powder under the tradename DISPARLON 6200, from King Industries Specialties Company, Norwalk, Conn. The recommended use in accordance with commercially available data sheets for this material is for epoxy adhesive and potting compounds in amounts of about 0.5 to about 3% by weight.

The present invention includes the presence of the polymeric matrix such as the above-mentioned polyamide material, in amounts of about 5 to about 15%, such as about 7 to about 10%, by weight of the total composition. When present in these amounts, the non-flowability characteristics of a composition can be obtained with minimal undesirable effects, such as loss of substantial tensile properties or sealing characteristics. Additionally, these materials can be added directly in solid form, such as in powder or particulate form, without pre-melting of the particles or even heating of the polymerizable compounds. It is often practical, however, to slightly heat the polymerizable compounds before or after incorporating the polymeric matrix for the sake of expediency. This is not necessary to obtain the non-flowable characteristics but is used as a practical and expedient processing measure.

The polyamide materials of the present invention desirably have a particle size less than about 15 microns, although other particle sizes are useful. As previously mentioned, the melting or softening point of the polymeric matrix materials ranges from about 200° F. (93° C.) to about 500° F. (260° C.). In a particularly desirable embodiment, a polyamide having a melting point of about 250° F.–270° F. (121° C.–132° C.) and desirably about 260° F. (127° C.) is employed.

Other materials can be added to the polyerizable monomers. Anaerobic polymerizable compositions typically employ stabilizers, accelerators, thickeners, coloring agents and the like in suitable amounts for their intended purposes.

Inhibitors and chelators, well recognized in the art for imparting stability to polymerizable compositions, are recommended. It is preferred that they be added to the composition prior to adding the polymeric matrix material. Those inhibitors useful in the present composition may be selected from any of the known inhibitors including those selected from hydroquinones, benzoquinones, naphthoquinones, phenanthraquinones, anthraquinones, and substituted compounds of any of these. Among the chelators which may be optionally present in the adhesive composition are the beta-diketones, ethylenediamine tetraacetic acid ("EDTA") and the sodium salt of EDTA. Both the inhibitors and chelators may be effectively employed in levels of about 0.1 to about 1% by weight of the monomer, without adversely affecting the speed of cure of the polymerizable adhesive composition.

Thickeners, plasticizers, pigments, dyes, diluents, fillers, and other agents common to the art can be employed in any reasonable manner to produce desired functional characteristics, providing they do not significantly interfere with the monomer polymerization. Inert fillers are present in relatively high amounts as compared to conventional threadlocking systems. Most desired are fillers which add lubricity and sealing characteristics to the compositions. TEFLON (polytetrafluoroethylene) and polyethylene are non-limiting examples.

The present invention does not include the materials disclosed in U.S. Pat. No. 3,547,851 as those useful for the polymeric matrix material. Thermoplastic polymers used to achieve non-flowability in that patent were found to be ineffective for purposes of the present invention.

Preparation of the compositions and products of the present invention can be achieved by simple admixture of the polymeric matrix material into the polymerizable composition. No premelting of the polymeric matrix is necessary and the polymeric matrix can be in either the liquid or solid form prior to incorporation thereof. Although it is not necessary to heat the polymerizable composition prior to incorporation of the polymeric matrix, as a practical matter it is desired to slightly elevate the temperature to about 50° C. (122° F.), while using a mixer or dispenser machine to incorporate the polymeric matrix. Mixing is performed for a time sufficient to incorporate the matrix material, into the polymerizable composition, which can vary depending on the batch size. Generally, only seconds or minutes are required to achieve the desired blending in of the matrix material. The composition will render itself non-flowable in approximately 2 to about 100 hours at room temperature depending on the nature of the polymerizable composition. This is due to the unique nature of the polymeric matrix, which is designed to be swellable and effectively form a branched matrix in situ. While not wishing to be bound by any particular hypothesis, it is believed that the polymeric matrix particles retain their particulate nature, yet imbibe large amounts of the polymerizable composition. In doing so, they lend the non-flowable characteristics to the polymerizable composition, yet apply smoothly to a surface by virtue of its particulate nature. It appears that a portion of the matrix particle is solubilized which permits the imbibing, and a portion remains unsolubilized which allows for retention of its particulate form.

The amount of polymeric matrix is only limited on the upper end by the strength and stiffness required in the final product. Of course, this must be balanced with the desired strength of the adhesive or the particular sealing characteristics desired. As previously mentioned, optimum ranges for obtaining a variety of useful high and low strength threadlocking properties have an upper range of about 15% by weight. The lower 5% range is dictated by the ability of the material to provide a non-flowable characteristics in the final composition. The polymerizable compositions of the present invention may cure via a variety of curing mechanisms. Moreover, the compositions can be heat curable or heat accelerated as well as having the ability to cure at room temperature. In the case of compositions, which include a combination of acrylate and silicone groups, moisture curing is also contemplated.

The present invention also contemplates and article of manufacture which includes the above-mentioned non-flowable composition in a dispenser or applicator. Desirably the dispenser is a pocket-size, lipstick-type dispenser which can be carried by the mechanic or maintenance worker without fear of spillage or contamination of sensitive parts and used as needed. The dispenser typically is generally elongate in shape and designed to mechanically advance the composition through a dispense opening. The dispense opening can be defined as the entire perimeter of the container wall or it can be smaller apertures located on the end surface of the container. The perimeter or aperture which defines the dispense opening can be smooth, notched or wavy, such as in a sinusoidal wave. Additionally, a portion of the dispense end of the container can be concave to accommodate a threaded member or tubular body which requires application of the composition.

Alternatively, the dispense end of the container may have a dispense opening which is defined by apertures such as slots or holes on the top surface. These apertures can be combined with other features described above, such as the concave surface or perimeter for accommodating threaded members or other cylindrical parts.

The container is generally fitted with a cap which fits over and around the container walls. The cap can also be designed at its closed end to have the concave portion and/or apertures as defined previously.

At the container end opposite the dispense opening i.e., the bottom end of the container is proximally located a mechanism for mechanically advancing the adhesive. These mechanisms are generally well known in the art and include a pusher means which can include a knob located at the bottom of the container which when turned in one direction advances the adhesive contained therein to the dispense opening and when turned in the other direction moves the adhesive in the opposite direction.

The article of manufacture can be more particularly described referring to FIGS. 1–11. FIG. 1 shows dispense container 10 having a generally elongate tubular shape defined by wall 20 and having a dispense end defined by perimeter 21. Cap 50 as shown is designed for closingly engaging tubular wall 20 by fitting thereover.

Figure 2:
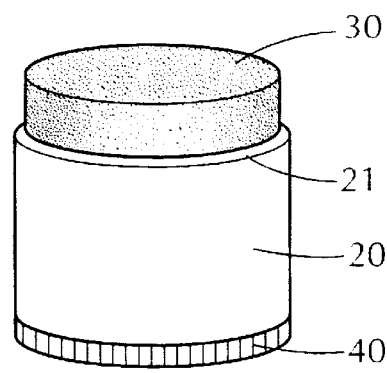
FIG. 2 is a perspective view of a lipstick-type container showing the adhesive composition contained therein.

Composition 30 is shown in FIG. 1 within container 10. FIG. 2 shows composition 30 being advanced above perimeter 21 using knurled knob 40 which was turned to advance the composition. Turning knob 40 in the opposite direction causes composition 30 to descend back within the container.

Figure 3:
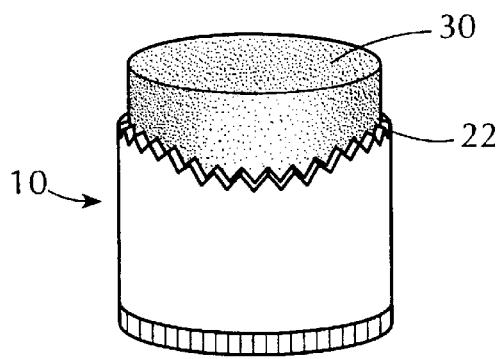
FIG. 3 is a perspective view of a dispenser container showing a notched rim at the dispense opening.
Figure 4:
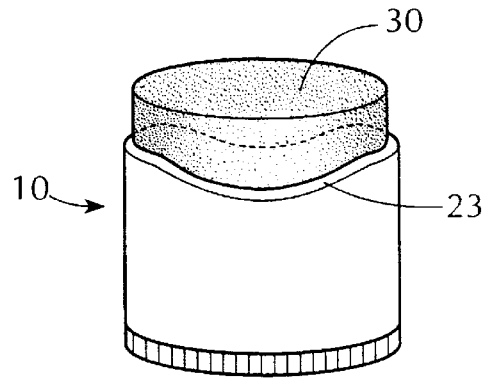
FIG. 4 shows a dispense container having a concave section at its dispense opening for receiving geometrically complimentary parts.
Figure 5:
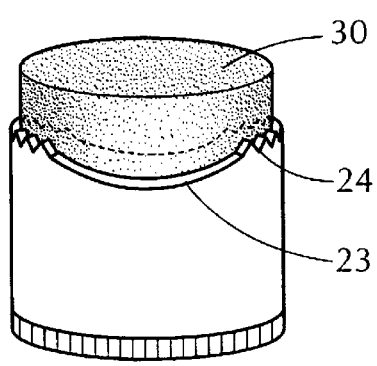
FIG. 5 shows a dispense container having both a concave section and a notched section at its dispense opening rim.

FIG. 3 shows container 10 having a dispense perimeter defining the opening being notched. Such a design could alternatively be sinusoidal or have other geometric shape which can be tailored to the type of surface on which the composition is to be applied. For example, FIG. 4 shows container 10 having opposed concave surfaces in its perimeter 23 for accommodating parts having rounded surfaces such as a bolt, screw or rod-like parts. FIG. 5 shows a combination of opposed concave surfaces in perimeter 24 in combination with oppositely opposed geometric portions of the same perimeter.

Figure 6:
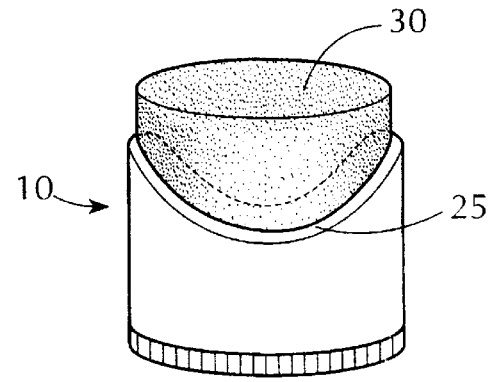
FIG. 6 is a perspective view of a dispensing container showing the dispense opening being concave.

FIG. 6 shows container 10 having a large portion of its perimeter 25 having opposed concave portions.

Figure 7:
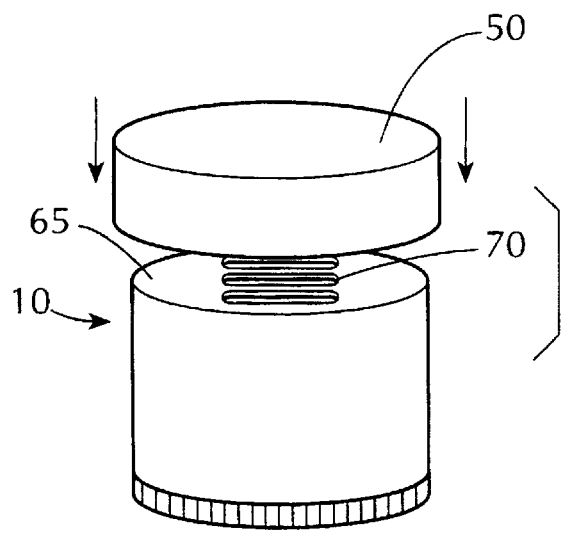
FIG. 7 is a perspective view of a container and cap showing the dispense opening defined by slotted apertures.

FIG. 7 shows container 10 having a dispense end with end surface 65 and elongate aperatures 70 through which the composition is dispensed.

Figure 8:
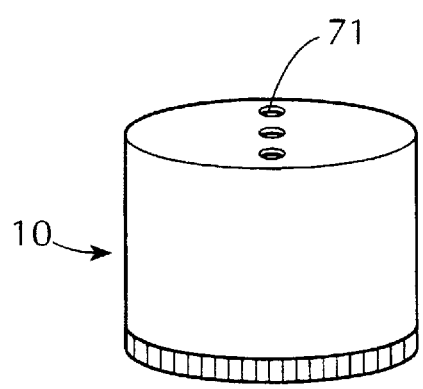
FIG. 8 shows a perspective view of a container and cap having the dispense opening defined by generally circular apertures.

FIG. 8 shows a different aperture shape in the form of a generally circular aperture 71.

Figure 9:
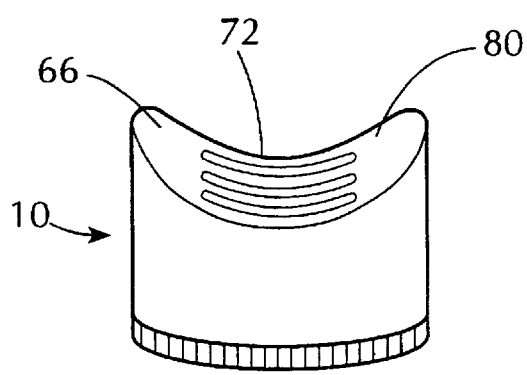
FIG. 9 is a perspective view of a dispense container and cap showing the dispense opening having a concave surface portion and slotted apertures therein.
Figure 10:
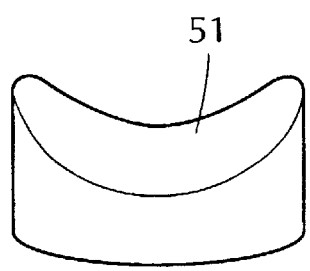
FIG. 10 is a perspective view of a cap for a dispense container with one end being concave.
Figure 11:
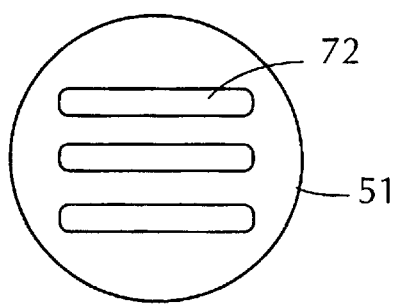
FIG. 11 shows a top view of the cap of FIG. 10 showing elongate apertures for dispensing compositions.

FIG. 9 shows container 10 having an end surface 66 in which aperature 72 are both elongate and concave since they follow the geometry of the end surface 66. Cap 51 for this container fits around perimeter 80 and may be designed with or without aperatures. In FIGS. 10 and 11, the design with apertures is shown, where cap 51 has elongate apertures which can be opened or closed by closure means, not shown, and which can be fitted over perimeter 80.

The following non-limiting examples are intended to further illustrate the present invention.

EXAMPLES

Anaerobic compositions A–C were prepared in accordance with the formulations set forth herein. Inventive compositions 1–5 in Table I were prepared by incorporating the indicated amount of polymeric matrix material in powder form and mixing in a dispenser for about 30 seconds until the polymeric powder is fully dispersed or miscible with the anaerobic composition. The anaerobic composition may optionally be slightly heated prior to incorporation of the polymer matrix, e.g., at about 122° F. (50° C.).

TABLE I

INVENTIVE NON-FLOWABLE COMPOSITIONS (wt. %)

| Component | Composition No. | | | | |
|---|---|---|---|---|---|
| | 1 | 2 | 3 | 4 | 5 |
| Composition A | 91 | — | — | 95 | 85 |
| Composition B | — | 91 | — | — | — |
| Composition C | — | — | 91 | — | — |
| Polymeric Matrix[(1)] | 9 | 9 | 9 | 5 | 15 |

[(1)]Polyamide having m.p. 262° F.

Each of the inventive compositions were dispensed into lipstick-type dispenser packages and aged overnight at about 122° F. (50° C.). In each of the inventive compositions, the same polyamide was used in amounts ranging from 5% to about 15% by weight of the total composition. The polyamide chosen had a melting point of about 262° F. (128° C.) and a particle size of less than about 15 microns. The polyamide chosen is a proprietary material sold under the tradename DISPARLON 6200. This polyamide has the property of swelling when dispersed into compatible liquid at a certain temperature. This temperature is known as the activation temperature because at this temperature the swelling results in an increase in viscosity of the liquid. In the present invention, these materials allow for a normally room temperature flowable composition, such as an anaerobic composition, to be rendered non-flowable at room temperature and remain non-flowable up to temperatures of 182° F. (83° C.) or more. In each of the inventive compositions 1–5, the resultant composition, even after accelerated heat aging, was a self-supporting adhesive mass, exhibiting a soft non-flowable consistency which was easily dispensed onto parts by wiping the dispenser across the intended surface.

Threaded bolts were coated with the control compositions and the inventive compositions respectively by manual application from a lipstick-type dispenser. The bolts were then mated with nuts and allowed to cure 24 hours. The initial break-torque in inch-pounds was recorded and is shown in Table II. Certain compositions were tested after accelerated aging for 1 week, 4 weeks and 8 weeks at 112° F. (50° C.), respectively.

TABLE II

| Compositions | Break Torque Tests (in. lbs.) | | | |
|---|---|---|---|---|
| | Initial (24 hr.) | 1 Wk @ 50° C. | 4 Wks @ 50° C. | 8 Wks @ 50° C. |
| Contr. Comp. A | 63 | 58 | 73 | 78 |
| Contr. Comp. B | 17 | — | — | — |
| Contr. Comp. C | 215 | — | — | — |
| Inv. Comp. 1 | 52 | 52 | 57 | 47 |
| Inv. Comp. 2 | 12 | — | — | — |
| Inv. Comp. 3 | 132 | — | — | — |

POLYMERIZABLE ANAEROBIC COMPOSITION A (Thread Locker)

| Component | Wt. % |
|---|---|
| polyglycol dimethacrylate | 64 |
| polyglycol oleate | 26 |
| saccharin | 3 |
| cumene hydroperoxide | 2 |
| propylene glycol | 2 |

TABLE II-continued

| fumed silica | 2 |
| N,N-dialkyltoluidine | 1 |
| hydroquinone | (100 ppm) |

POLYMERIZABLE ANAEROBIC COMPOSITION B (Pipe Sealant)

| Component | Wt. % |
|---|---|
| bisphenol A fumarate resin | 26 |
| polyglycol dimethacrylate | 21 |
| mica | 16 |
| octanol | 12 |
| polyglycol dioctanoate | 11 |
| cumene hydroperoxide | 7 |
| PTFE | 2 |
| organic esters | 2 |
| fumed silica | 2 |
| titanium dioxide | 1 |
| hydroquinone | (100 ppm) |

POLYMERIZABLE ANAEROBIC COMPOSITION C (High Strength Thread Locker)

| Component | Wt. % |
|---|---|
| polyglycol dimethacrylate | 67 |
| bisphenol A fumarate resin | 24 |
| saccharin | 3 |
| cumene hydroperoxide | 2 |
| polyethylene | 2 |
| N,N-dialkyltoluidine | 1 |
| fumed silica | 1 |
| hydroquinone | (100 ppm) |

While the invention has been described in reference to various aspects and embodiments, it will be appreciated that the invention is not limited by these, but may be subject to numerous variations, modifications and other embodiments, all which are contemplated within the spirit and scope of the invention as claimed.

What is claimed is:

1. An adhesive composition comprising:

a. at least one room-temperature flowable polymerizable compound; and b. polymeric matrix selected from the group consisting of polyamides, polyacrylamides, polyimides, polyhydroxyalkylacrylates and combinations thereof, and present in an amount sufficient to render said compositions non-flowable at temperatures up to about 180° F. (82° C.) and wherein said composition is dispensable at room temperature without application of heat.

2. The composition of claim 1, wherein said polymeric matrix comprises an organic material having a melting point or softening point greater than about 200° F. (93° C.).

3. The composition of claim 1, wherein said polymeric matrix comprises a polyamide having a melting point of about 262° F. (128° C.).

4. The composition of claim 1, being non-flowable at temperatures of at least about 160° F. (71° C.).

5. The composition of claim 1, being non-flowable at temperatures of at least about 180° F. (82° C.).

6. The composition of claim 1, wherein said polymerizable compound is a poly(meth)acrylate ester.

7. The composition of claim 6, wherein said poly(meth) acrylate ester has the formula:

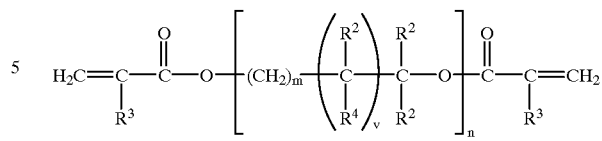

wherein $R^2$ may be selected from hydrogen, alkyl of 1 to about 4 carbon atoms, hydroxyalkyl of 1 to about 4 carbon atoms or

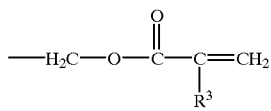

$R^3$ may be selected from hydrogen, halogen, and alkyl of 1 to about 4 carbon atoms and $C_{1-8}$ mono- or bicycloalkyl, a 3 to 8 membered heterocyclic radical with a maximum of 2 oxygen atoms in the ring;

$R^4$ may be selected from hydrogen, hydroxy and

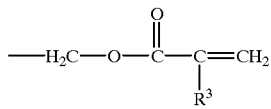

m is an integer equal to at least 1, n is an integer equal to at least 1, and v is 0 or 1.

8. The composition of claim 1, further including a polymerization initiator.

9. The composition of claim 8, wherein said polymerization initiator is a peroxy compound.

10. The composition of claim 1, further including a material selected from the group consisting of polymerization inhibitors, free radical scavengers, chelators, fillers, viscosity modifiers, lubricity agents, coloring agents, fluorescent agents, catalysts and combinations thereof.

11. The composition of claim 1, wherein the polymeric matrix is present in amounts of about 5% to about 15% by weight of the composition.

12. The composition of claim 1, wherein the polymeric matrix is present in amounts of about 7% to about 10% by weight of the composition.

13. The composition of claim 1, wherein said polymerizable compound is selected from the group consisting of anaerobics, epoxies, acrylics, polyurethanes, olefinic compounds, and combinations thereof.

14. The composition of claim 1, further including a curing agent or curing system for said polymerizable compounds.

15. The composition of claim 14, wherein said curing agent or curing system is contained in a rupturable encapsulate.

16. The composition of claim 1, further including a polymerization catalyst.

17. The composition of claim 1, further including a material selected from the group consisting of polymerization inhibitors, free radical scavengers, chelators, fillers, viscosity modifiers, lubricity agents, coloring agents, fluorescent agents, and combinations thereof.

18. An anaerobic adhesive composition comprising:

a. a polymerizable (meth)acrylate monomer;

b. a polymerization initiator; and c. a polymeric material selected from the group consisting of polyamides, polyacrylamides, polyimides, polyhydroxyalkylacrylates and combinations thereof, and present in an amount sufficient to render said composition non-flowable at temperatures of at least about 120° F. (49° C.) and wherein said composition is dispensable at room temperature without application of heat.

19. The composition of claim 18, wherein said composition remains non-flowable at temperatures of about 160° F. (71° C.).

20. The composition of claim 19, wherein said polymeric matrix comprises a polyamide having a melting point of greater than about 250° F. (121° C.).

21. A non-flowable composition comprising a self-supporting combination of:
   a. a polymerizable(meth)acrylate monomer;
   b. a polymerization initiator; and
   c. a polymeric material present in a sufficient amount to render the composition non-flowable at temperatures of at least about 120° F. (49° C.) and wherein said composition is dispensable at room temperature without application of heat.

22. An article of manufacture comprising:
   a. a dispensing container for housing and dispensing a non-flowable adhesive or sealant composition, said container comprising a generally elongate hollow body having first and second ends, with one of said ends defining a dispense opening; and
   b. an adhesive or sealant composition within said container, said composition comprising:
      (i) a polymerizable (meth)acrylate monomer;
      (ii) a polymerization initiator; and
      (iii) a polymeric material present in an amount sufficient to render the composition non-flowable at temperatures of at least about 120° F. (49°) and wherein said composition is dispensable at room temperature without application of heat.

23. The article of manufacture of claim 22, wherein said container is tubularly shaped.

24. The article of manufacture of claim 22, wherein said container is a lipstick-type container.

25. The article of manufacture of claim 22, wherein said end defining said dispense opening is adapted for applying said composition to threaded members.

26. The article of manufacture of claim 25, wherein said dispense opening has a concave portion for dispensing onto complementing geometric shapes.

27. The article of manufacture of claim 26, wherein said dispense opening has a notched edge.

28. The article of manufacture of claim 22, wherein said dispense opening comprises one or more apertures, further including a cap for closing said dispense opening, said cap having an opening for closing engagement with said container, said opening defined by walls which terminate at a closed end of said cap.

29. The article of manufacture of claim 28, wherein said closed end of said cap has apertures for dispensing said composition.

30. The article of manufacture of claim 29, wherein said apertures of said cap are shaped to communicate with threaded members requiring said composition.

31. The article of manufacture of claim 30, wherein said cap further includes closure means for said apertures.

32. A method for preparing a non-flowable polymerizable composition comprising:
   a. providing at least one room-temperature flowable polymerizable compound, and
   b. combining said polymerizable compound with a polymeric matrix present in an amount sufficient to render said flowable combination non-flowable at temperatures of at least about 120° F. (49° C.) and wherein said composition is dispensable at room temperature without application of heat.

* * * * *

UNITED STATES PATENT AND TRADEMARK OFFICE
CERTIFICATE OF CORRECTION

PATENT NO. : 6,451,927 B1
DATED : September 17, 2002
INVENTOR(S) : Hans Haas et al.

It is certified that error appears in the above-identified patent and that said Letters Patent is hereby corrected as shown below:

Title page,
Item [75], change "Westbrook" to -- Stow, OH -- and delete "both of"
Item [73], change "Loctite Corporation" to -- Henkel Loctite Corporation --

Column 1,
Line 4, change "appli." to -- application --
Line 5, delete "Ser."
Line 57, change "a" to -- an --
Line 60, change "and" to -- an --

Column 5,
Line 34, change "alklamino-$C_{1-8}$" to -- alkylamino -- $C_{1-8}$ --

Column 6,
Line 52, change "hydrolyoize" to -- hydrolyze --

Column 7,
Line 38, change "polyerizable" to -- polymerizable --

Column 8,
Line 43, before "non-flowable" delete -- a --
Line 51, change "and" to -- an --

Signed and Sealed this

Eighth Day of April, 2003

JAMES E. ROGAN
*Director of the United States Patent and Trademark Office*